United States Patent [19]

Carney

[11] Patent Number: 4,550,277
[45] Date of Patent: Oct. 29, 1985

[54] OVERLOAD DETECTION AND WARNING SYSTEM FOR ELECTRIC MOTORS IN POWER TOOLS AND THE LIKE

[75] Inventor: Joseph E. Carney, Baltimore, Md.

[73] Assignee: Black & Decker Inc., Newark, Del.

[21] Appl. No.: 653,780

[22] Filed: Sep. 24, 1984

[51] Int. Cl.[4] .............................................. H02P 5/16
[52] U.S. Cl. ................................... 318/334; 318/434; 318/245; 318/475; 318/341; 364/474
[58] Field of Search ............... 318/307, 309, 311, 326, 318/327, 328, 332, 333, 334, 336, 430–438, 476, 477, 471, 472, 473; 361/21–33; 364/474, 475

[56] References Cited

U.S. PATENT DOCUMENTS

| | | | |
|---|---|---|---|
| 2,716,368 | 8/1955 | Thompson | 82/1 |
| 3,564,372 | 2/1971 | Vogelsberg et al. | 318/345 |
| 3,569,807 | 3/1971 | Ulrich | 318/332 X |
| 3,849,709 | 11/1974 | Berman et al. | 318/227 |
| 4,041,541 | 8/1977 | Frossard et al. | 361/27 |
| 4,052,625 | 10/1977 | Cameron | 307/252 K |
| 4,056,762 | 11/1977 | Schädlich | 318/434 |
| 4,066,942 | 1/1978 | Bardwell et al. | 318/434 |
| 4,195,254 | 3/1980 | Gurwicz et al. | 318/334 |
| 4,249,117 | 2/1981 | Leukhardt et al. | 318/434 X |
| 4,291,355 | 9/1981 | Dinger | 361/31 |
| 4,301,396 | 11/1981 | Bourke | 318/139 |
| 4,306,264 | 12/1981 | Alessio | 361/23 |
| 4,307,325 | 12/1981 | Saar | 318/334 |
| 4,317,176 | 2/1982 | Saar et al. | 318/434 X |
| 4,320,329 | 3/1982 | Gille et al. | 318/443 |
| 4,322,668 | 3/1982 | Trussler et al. | 318/434 |
| 4,379,986 | 4/1983 | Baxter et al. | 361/94 X |
| 4,386,305 | 5/1983 | Kohzai et al. | 364/474 X |
| 4,408,244 | 10/1983 | Weible | 361/24 |
| 4,430,681 | 2/1984 | Benzing | 361/27 |

Primary Examiner—William M. Shoop, Jr.
Assistant Examiner—Shik Luen Paul Ip
Attorney, Agent, or Firm—Harness, Dickey & Pierce

[57] ABSTRACT

Thermal overload of the power tool is sensed by comparing a continually updated thermal model of the tool with a predetermined limit. The thermal model is updated in accordance with operating parameters such as motor speed and power delivered (conduction angle) and implemented using numerical integration based on a look-up table matrix. When overload is detected, power to the tool is gradually reduced, with attendant reduction in speed, followed by a cyclic or warbling increase and decrease in power to provide fluctuating low speed behavior, which may be readily recognized by the tool operator as an overload warning.

11 Claims, 11 Drawing Figures

OVERLOAD DETECTION AND WARNING SYSTEM FOR ELECTRIC MOTORS IN POWER TOOLS AND THE LIKE

BACKGROUND OF THE INVENTION

1. Field of the Invention

The present invention relates generally to the power tools and electric motors for controlling such tools. More particularly, the invention relates to a microprocessor-based or microcomputer-based control circuit for monitoring tool operating conditions, such as thermal overload conditions, and for providing a unique warning or indication when a given overload condition has been reached.

2. Description of the Prior Art

In controlling the speed of an electric motor for use in power tools, it is now generally known to use gated electronic power controlling devices, such as SCR's or triacs, for periodically transferring electrical energy to the motor. Many popular power tools employ universal motors, which are readily controllable using such gated controlling devices.

Generally speaking, gated speed control circuits work by switching the motor current on and off at periodic intervals relative to the zero crossing of the a.c. current of voltage waveforms. These periodic intervals occur in synchronism with the a.c. waveform and are measured in terms of a conduction angle, measured as a number of degrees. The conduction angle determines the point within the a.c. waveform at which electrically energy is delivered to the motor. For example, a conduction angle of 180° per half cycle corresponds to a condition of full conduction, in which the entire, uninterrupted alternating current is applied to the motor. Similarly, a 90° conduction angle corresponds to developing the supply voltage across the motor commencing in the middle of a given half cycle, and thus corresponds to the delivery of approximately half of the available energy to the motor. Conduction angles below 90° correspond to the transfer of even lesser quantities of energy to the motor.

With most power tools it is desirable to have some form of overload protection to warn the tool operator when excessive motor temperatures have been reached. In accordance with the teachings of U.S. Pat. No. 4,307,325, entitled "Digital Control System for Electric Motors in Power Tools and the Like", issued to Saar on Dec. 22, 1981, it is now known that the temperature of a power tool motor can be inferred from information already available to the motor speed control circuit. More specifically, the factors which control the temperature of the motor are the current drawn by the motor and the means provided for dissipating the heat generated by the motor. In most power tools a cooling fan is driven directly by the armature of the motor, and thus the cooling effect contributed by the fan can be determined from the measured speed of the motor. In addition, the current drawn by the motor can be determined from the speed of the motor and from the conduction angle at which the gated electronic power controlling devices are operating.

As more fully discussed in the Saar reference, many motor control circuits prior to Saar simply establish a maximum current level for determining an overload condition. A disadvantage with this approach is that it fails to recognize that it is not solely the instantaneous current draw of the motor which determines whether or not it will overload. Not only are the effects of cooling not accounted for in this approach, but also there is no recognition of the time factor involved. Cooling effects momentarily aside, a change in current does not immediately invoke a corresponding change in motor temperature. Rather, the temperature of the motor will, at any given point in time, depend on the amount of current being drawn and on the period over which such current has been drawn. Taking these factors into account, the overload protection scheme disclosed in the Saar patent utilizes, in effect, a numerical integrator in order to distinguish between safe operating conditions and the imminent occurrence of overload conditions.

Related to the problem of overload detection is the problem of how best to inform the tool operator when overload occurs. The warning must be clear, recognizable, and distinguishable from other warnings and operating modes. The traditional approach to providing warnings is through the use of indicator lights and audible alarms. Practical experience has shown that tool operators normally look at the cutting end of the implement and will therefore fail to notice flashing indicator lights located on the tool body. Audible alarms are likewise ineffective. The typical audible alarm, like the ones used in smoke detectors, produces sound pressure levels from 70 to 75 dB. A working drill, for example, creates sound pressure levels from 90 to 100 dB and will therefore mask the sound of the audible alarm. In addition, both lights and alarms also require additional power supply and interface circuitry which increase the cost of the tool and take up space, making the tool heavier and bulkier.

SUMMARY OF THE INVENTION

The present invention provides a unique overload detection and warning system which overcomes the problems associated with lights and audible alarms. In accordance with the invention, a method for providing a warning that a given operating condition has been reached in a power tool is provided. The method comprises detecting the given operating condition; gradually reducing the power delivered to the tool until a predetermined reduced power level is reached; and cyclically increasing and decreasing the power delivered to the tool in predetermined amounts. As a result of this method, when an overload condition is detected, using numerical integration methods for example, the speed of the tool decreases to a predetermined low power speed and then oscillates between that low power speed and a slightly higher speed repeatedly until the overload condition is alleviated. Thus the motor is made to exhibit a unique behavior, a reduced speed warbling behavior, which can be readily recognized by the operator as an overload warning and which will not be mistaken for normal operating behavior.

In accordance with the invention the overload warning can be reset by either removing the load from the tool while allowing the motor to run, or by manually switching the tool off and back on again. When the operator selects the first reset option (removing the load) the warning is terminated, but if overload conditions continue to persist, a second (third, etc.) warning will again occur in a relatively short time. If the operator selects the latter reset option (switching the power off and then on again) the warning is terminated and the tool may be operated for a relatively longer time before the next warning occurs. The overload detection algorithm is operative during the entire time the tool is plugged in to a source of a.c. line current. Thus, even when the power switch is off, the numerical integrator algorithm for determining overload is operating.

For a more complete understanding of the invention, its objects and advantages, reference may be had to the accompanying drawings and to the following specification.

DESCRIPTION OF THE PREFERRED EMBODIMENT

Figure 1:
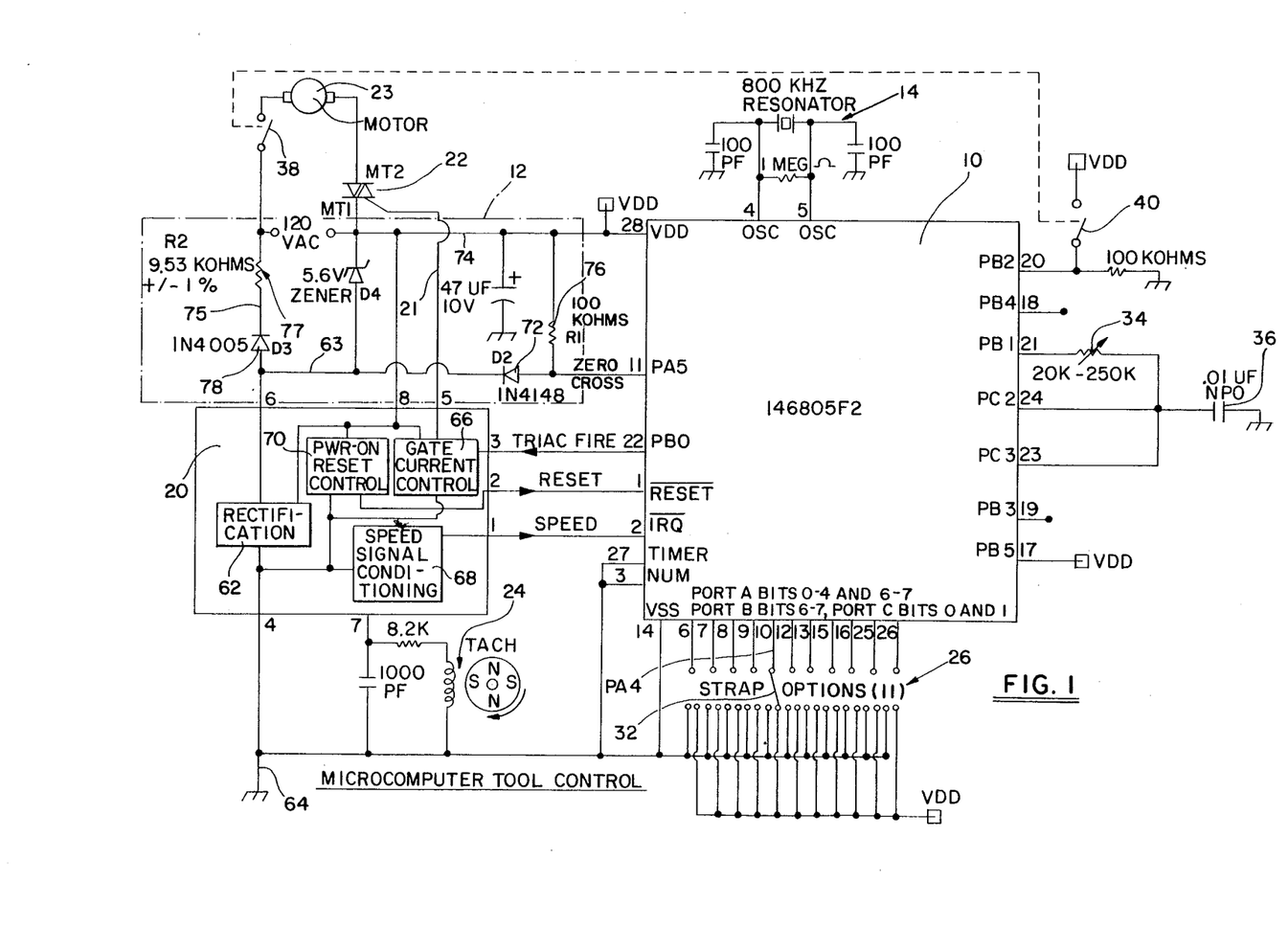
FIG. 1 is a schematic diagram of the microcomputer-based control circuit of the present invention.

Referring to FIG. 1, a circuit diagram of the electronic control circuit of the present invention is shown. The control circuit comprises microcomputer 10, which in the preferred embodiment is an MC146805F2 single chip, 8-bit microcomputer unit (MCU), containing an on-chip oscillator, CPU, RAM, ROM, I/O and TIMER. Although the preferred embodiment described herein discloses a microcomputer implementation, it is to be understood that the teachings of the present invention may also be implemented utilizing other forms of digital or analog circuitry, such as discrete digital or analog integrated circuits.

The microcomputer 10 receives power through a power supply circuit 12, which converts the 115 volt to 120 volt a.c. input signal to +5 volt DC signal. An 800 KHz. resonator 14 is coupled to the oscillator terminals (pins 4 and 5) to provide a stable clock for operating the microcomputer 10.

Microcomputer 10 is provided with a first group of eight input/output lines comprising port A and a second group of eight input/output lines comprising port B. In addition, microcomputer 10 includes a third group of four lines comprising port C. The state of each line comprising port A and port B is software programmable. Port C is a fixed input port. In FIG. 1 the lines comprising ports A, B and C are identified by the alphanumeric designation PA5, PB0, PC2, and so forth, wherein the number refers to the binary line number (0–7) and the letter (A, B, or C) is the port designation.

Microcomputer 10 also includes a reset terminal, designated RESET, a maskable interrupt request terminal, designated IRQ, as well as the usual power supply connection terminals $V_{DD}$, and $V_{SS}$. The terminals designated TIMER and NUM are tied to $V_{SS}$, which is a floating ground.

The invention further comprises a signal processing circuit 20 which provides the functions of rectification, power on reset control, gate current control, and speed signal conditioning. Signal processing circuit 20, which is described more fully below, provides a speed signal to the interrupt request line IRQ of microcomputer 10. Signal processing circuit 20 also provides a reset signal to the RESET terminal of microcomputer 10. In turn, signal processing circuit 20 receives a triac fire signal from microcomputer 10. In response to the triac fire signal, circuit 20 provides a gating signal on lead 21 to the triac device 22 which controls the flow of power to motor 23. A tachometer, or equivalent motor speed sensing device is positioned to determine the rotational speed or rotational period of the armature of motor 23. Tachometer 24 produces a sinusoidal signal; the frequency of which is indicative of the rotational speed or rotational period of the motor 23. This signal is provided to signal processing circuit 20 which conditions the signal and applies it to the interrupt request terminal IRQ for further processing by microcomputer 10 as discussed below.

Signal processing circuit 20 includes a rectification circuit 62 coupled between node 63 and floating ground 64. Rectification circuit 62 may be implemented with a diode poled to conduct current in a direction from ground 64 to node 63, thereby placing node 63 substantially at (or at least one diode drop below) floating ground potential. Signal processing circuit 20 further includes a gate control circuit 66, preferably comprising a current switch, for supplying a current signal for firing triac 22 in response to the triac fire signal from microcomputer 10. Gate control circuit 66 thereby isolates microcomputer 10 from triac 22 while supplying the necessary current for triggering the triac. Signal processing circuit 20 further includes a speed signal conditioning circuit 68 such as a Schmitt trigger comparator circuit for supplying fast rise and fall time pulses to microcomputer 10 in response to the comparatively slow rise and fall time sinusoidal signal output of tachometer 24. Signal processing circuit 20 also provides a power on reset control circuit 70 which is coupled to the $V_{DD}$ terminal of power supply 12 to provide a reset signal to microcomputer 10 upon initial power up.

Included within power supply 12 is a diode 72 which is coupled to terminal PA5 of microcomputer 10 to provide a zero crossing detection signal. When line 74 of supply 12 is positive with respect to the opposite side of the a.c. supply line, current flows through resistors 76 and 77 and diode 78. Node 63 is thus at one diode drop below floating ground potential, and terminal PA5 assumes a logical LO state. When line 75 goes positive during the next half cycle, diodes 72 and 78 block current flow. Hence there is no voltage drop across resistor 76 and terminal PA5 is at $V_{DD}$ potential to assume a logical HI state. It will be seem that terminal PA5 is thus toggled between alternating LO and HI states in synchronism with each half cycle of the a.c. waveform and may thus be used to determine when each zero crossing occurs.

The present invention provides a motor speed controlling device which may be utilized with a number of different types and sizes of motors in a wide range of different power tool applications. In order to preset the operating characteristics of the circuit to correspond to predetermined operating parameters or to a predetermined power tool, an option strap arrangement, designated generally by reference numeral 26, is provided. Certain of the lines of port A, port B and port C may be connected to a logical LO voltage or a logical HI voltage to convey a predetermined desired operating characteristic or characteristics to microcomputer 10. For example, in FIG. 1 a strap 32 is shown connecting PA4 to place a logical HI signal on the PA4 bit of port A. It will be appreciated, that the particular arrangement of strap options, and the way in which microcomputer 10 interprets the bit patterns entered by the strap options will depend on the software, as those skilled in the art will recognize. In general, the strap option selections can be effected by any convenient means including the use of jumper wires or switches, or by selecting a printed circuit board with the appropriate traces being open or closed circuited.

The invention further comprises a means for producing an analog signal indicative of a desired operating characteristic of the motor, which in practice is selected by the operator during operation of the tool. Frequently, the desired operating parameter represents a desired motor speed, or a desired triac firing angle, or the like, and is inputted using a manually operable trigger. Although many different systems may be devised for providing instructions to the control circuit in accordance with the wishes of the operator, the presently preferred embodiment employs rheostat 34 as a trigger position trasducer. Rheostat 34 is in series with capacitor 36, which is in turn coupled to ground. By appropriately setting the input/output line PB1, capacitor 36 is alternately charged and discharged through rheostat 34. The charging time is proportional to the resistance of rheostat 34, which may be varied in accordance with the manually operable trigger setting. Thus, the charging and discharging time is indicative of the position of the trigger. By appropriate selection of capacitor 36, rheostat 34 and software timing, an analog signal indicative of a desired operating parameter may be determined in accordance with a trigger position. This analog signal may then be converted to a digital signal for use in microcomputer 10.

While the foregoing represents one way of inputting the desired operating parameter, or selection of a desired speed for example, other mechanisms may be employed without departing from the scope of the invention. In general, a wide variety of digital or analog transducers may be employed, with the appropriate interface circuitry (such as A to D coverters, for example) for communicating with microcomputer 10.

Figure 2:
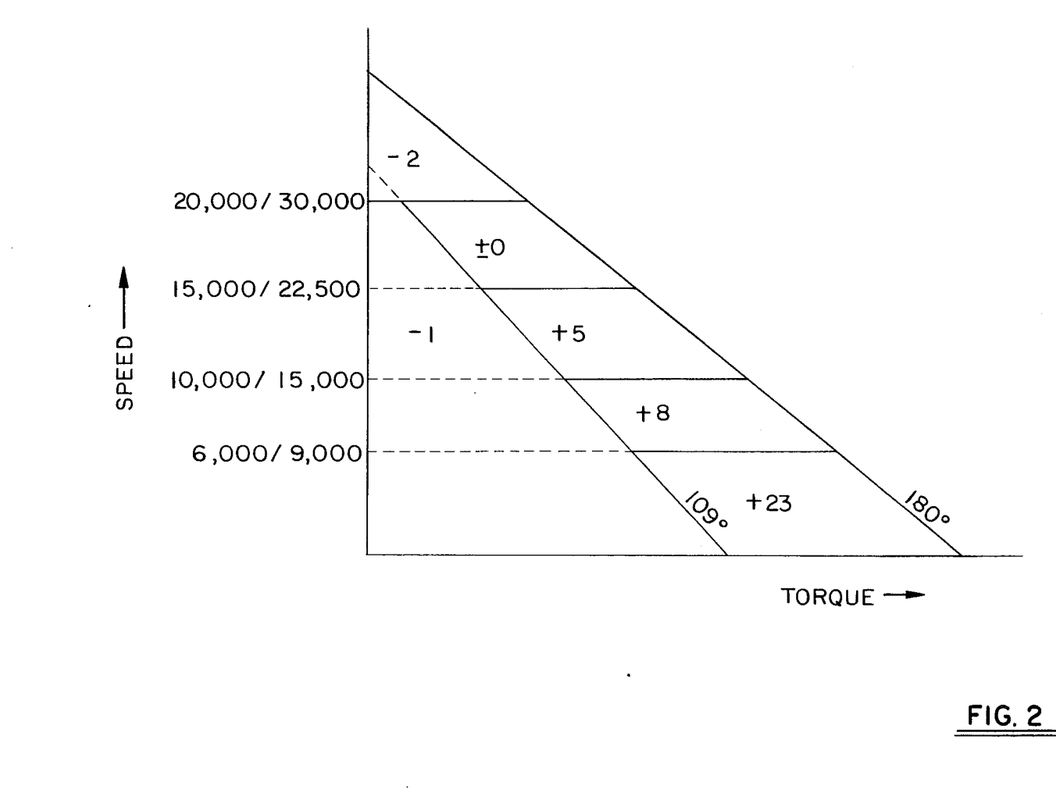
FIG. 2 is a graph of the speed versus torque curves for a motor controlled in accordance with the present invention, illustrating the overload heating values used in conjunction with the numerical integration thermal modeling technique of the invention.

Referring now to FIG. 2, the speed versus torque curves for the motor at two conduction angles are shown. The uppermost diagonal line represents full conduction (180°) while the lowermost diagonal line represents a lower conduction angle (109°). The area under the curves is divided further into five speed ranges, thereby creating a matrix. Each region in the matrix is assigned a "heating value", which is either a positive value or a negative value depending upon whether the motor experiences a net increase or decrease in temperature when operated in that region. The assigned heating values in the matrix take into account not only the degree of heat generated by the motor, but also the cooling effect caused by the airflow from the fan coupled to the motor armature. The magnitude of the number assigned to each region is determined empirically based upon the following three factors: (1) the net heating effect on the motor when continuously operated in that particular region; (2) the predetermined overload limit selected for the register; and (3) the frequency at which the contents of the register are updated.

The matrix of heating values shown in FIG. 2 is stored in microcomputer memory. Sixty times each second (once per line cycle) the microcomputer is programmed to "look-up" the appropriate heating value, based upon the present conduction angle of the triac device 22 and upon the measured speed of the motor, and then add (subtract) the value to the contents of a 16-bit "thermal model" register. In the preferred embodiment, an overload condition is signaled whenever the contents of the register equal a predetermined overload limit value.

The specific speed values which define the various speed ranges in the matrix, as well as the overload limit value, are chosen for a particular tool based upon the strap option setting which is read during power-up. By storing a plurality of different speed range and overload limit values (as indicated in FIG. 2) within the microcomputer memory, the process of fine tuning the matrix to match a particular tool becomes a matter of selecting the proper strap options at the factory. During normal running, the 16-bit thermal mode register is adjusted once per line cycle and its value may be increased, decreased or left unchanged based on the heating value matrix of FIG. 2.

Referring to FIG. 2, if the actual armature speed is above a predetermined high speed limit (e.g. 20,000/30,000 rpm) a hot tool is known to be cooling. For purposes of the presently preferred algorithm, the tool is hot if the thermal model register contains a value exceeding a predetermined threshold (10240 decimal, 2800 hex). If the actual speed is in excess of the high speed limit and the tool is hot, the thermal model register is increased by two units per line cycle or 120 units per second (assuming 60 Hz. line current). If the tool is not hot, i.e. if the value in the thermal model register does not exceed 2800 hex, the register is not increased or decreased, since even at relatively high speeds, tool cooling is negligible below a certain temperature.

If the actual speed is below the high speed limit value, the algorithm makes a determination of whether the actual conduction angle is less than 109°, which is indicative of moderate tool power. For conduction angles of less than 109° the thermal model register is decreased by one unit per line cycle if the register value is above 2800 hex; if the register value is below 2800 hex, the thermal model register is left unchanged. If the actual conduction angle exceeds 109°, subsequent thermal model register modification is based on actual operating speed. If the actual speed is above a second speed limit (15,000/22,500 rpm) the thermal model register is neither increased nor decreased. If the actual armature speed is below the second speed limit value but above a third speed limit value (10,000/15,000 rpm), the register is increased by 5 units per line cycle. If the speed is below the third speed limit value but above a fourth speed limit value (6,000/9,000 rpm), the thermal model register is increased by 8 units per line cycle. For speeds below the fourth limit value, the thermal model register is increased by 23 units per line cycle.

Whenever the tool is not running, the microcomputer decrements the thermal model register to simulate normal cooling. To prevent loss of the thermal model register data, the microcomputer is powered whenever the line cord is plugged in. The tool trigger switch does not need to be depressed in order for the microcomputer to be active. Once the tool is plugged in, the system starts at zero and assumes that the tool is cold. When the tool is not running, the cooling is very slow, to simulate this, the thermal model register is decremented at a selected rate of less than 1 unit per line cycle. This is accomplished by setting another counter to measure a specific number of powerline half cycles (e.g., 14) and then decrementing this counter each half cycle. When this half cycle counter times out, the thermal model register is decremented by 1 unit and the powerline half cycle counter is restarted. The thermal model register is never allowed to decrement below zero.

The flow chart diagrams of FIGS. 4 through 11 may be consulted for a more complete understanding of the invention in operation. It will be understood that in practice, the sequence of steps illustrated in the flow charts are performed by microcomputer 10 based on a stored set of instructions contained within the microcomputer's read only memory.

Figure 4:
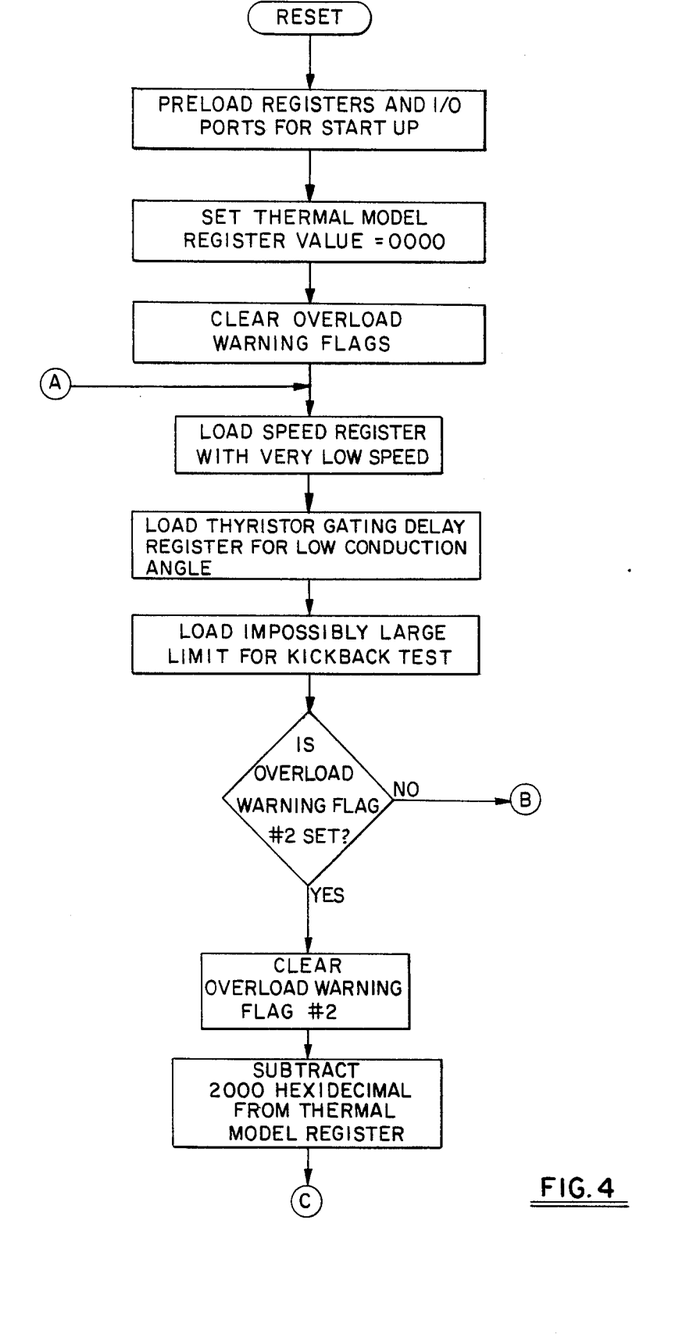
FIGS. 4 through 11 are flow chart diagrams illustrating the steps for implementing the overload detection and warning system of the invention in greater detail.

Referring to FIG. 4, the tool begins upon power-up by preloading the registers and input/output ports for start-up. At this time the strap options are read and the appropriate speed range and overload limit values determined. Also, at this time the thermal model register is initialized to zero and all overload warning flags are cleared. Specifically, the present algorithm uses a first software flag or flag No. 1 to indicate when an overload condition has been reached. A second flag, designated flag No. 2, is used to indicate that the tool is operating in a warning state characterized by low-speed, oscillating speed behavior. The flow charts of FIGS. 4 through 11 also depict a third flag, designated flag No. 3, which is used to interface the overload detection and warning algorithm of the invention with other motor control algorithms, such as anti-kickback detection algorithms, motor voltage ramp-up, or the like. Overload warning flag No. 3 may be interrogated by such other motor control algorithms to insure that they will coordinate with the overload detection and warning algorithm of the invention.

Following the above initializing routines, execution proceeds at point A, whereby a speed register is loaded with a very low speed value and the triac or thyristor control is set for starting the motor by loading a suitably low conduction angle value into a gating delay register. At this time, registers for controlling other motor control functions, such as anti-kickback detection functions, may be initialized. Once these operating registers have been loaded with the appropriate starting values, the overload warning flag No. 2 is tested to determine if it has been set. If it has been set, indicating that the tool is presently operating in its warning mode, the overload warning flag No. 2 is cleared and the thermal model register is decremented by 2000 hexadecimcal units, whereupon control branches to point C of FIG. 5. If the overload warning flag No. 2 is not set, control branches to point B of FIG. 5.

Figure 5:
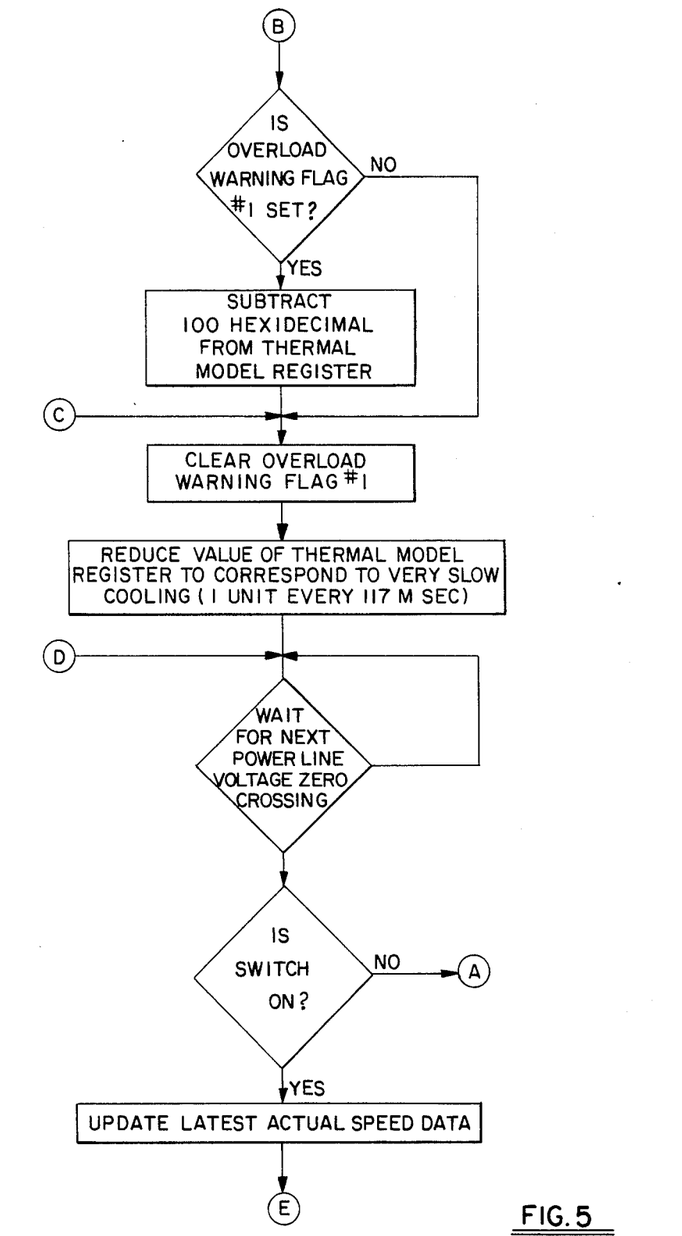

Referring to FIG. 5, and beginning at point B, the algorithm of the invention tests the overload warning flag No. 1 to determine if it is set. If it is not set, indicating that an overload condition has not been detected, control branches to point C. If flag No. 1 is set, indicating that an overload condition has been detected, but the tool has not fully entered the warning mode, the thermal model register is decremented by 100 hexadecimal units and control proceeds to point C. This slight reduction in the thermal model register value in effect makes the thermal model appear as if the tool is 100 hexadecimal units from the overload point.

Figure 6:
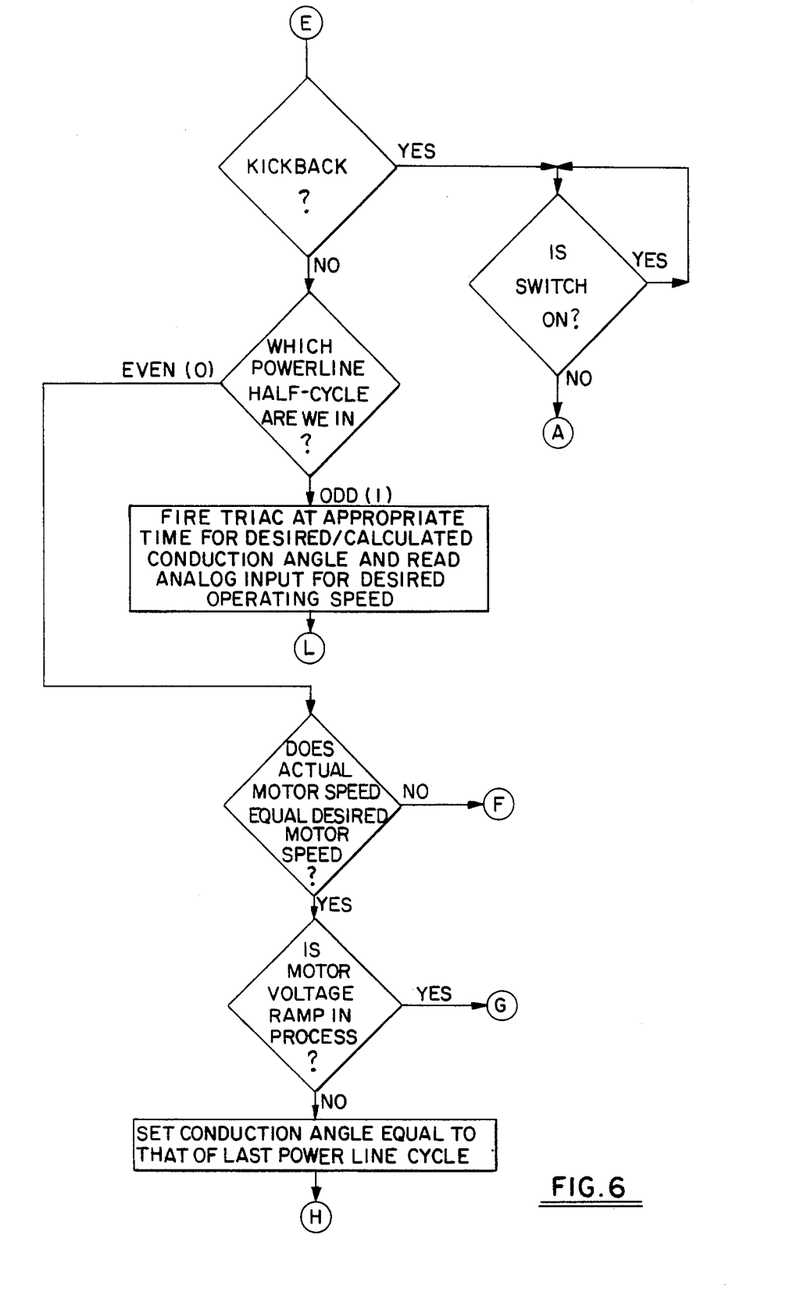

Continuing at point C of FIG. 5, the overload warning flag No. 1 is then cleared and the thermal model register is reduced at a rate of 1 unit per 117 milliseconds to simulate very slow cooling of the tool. Following this reduction, the algorithm continues at point D to wait for the next powerline voltage zero crossing. When this crossing occurs, the routine tests to determine whether the manually operable trigger switch is on. If not, control branches to point A (FIG. 4) and the above described sequence of steps is repeated. If the trigger switch is on, the actual speed data is updated (based on a reading of tachometer 24) and control continues at point E of FIG. 6, where operating conditions such as kickback may be tested for. As illustrated in FIG. 6, the anti-kickback routine jumps to point A after kickback is detected and the trigger switch is released. Otherwise, the routine determines whether it is in the odd or the even powerline half cycle. If in the odd half cycle, the triac or thyristor is fired at the appropriate time, based on the desired (calculated) conduction angle and based upon the desired operating speed read as an analog signal determined by rheostat 34. After having fired the triac or thyristor, in the odd cycle, control branches to point L of FIG. 9, whereupon the next kickback limit value is calculated and control loops back to point D to wait for the next powerline voltage zero crossing.

In the even half cycle, the actual motor speed is compared with the desired motor speed. If these speeds are not equal to one another, control branches to the speed-up or slow-down routines beginning at point F on FIG. 7. If these speeds are equal, the algorithm determines whether a motor voltage ramp (speed change ramp) is in progress. If a voltage ramp is in progress, the ramp is terminated by branching to point G of FIG. 7 (since the actual speed equals the desired speed and thus the ramp is no longer mecessary). If a motor voltage ramp is not in progress, the conduction angle is set equal to the conduction angle of the last powerline cycle, so tht the motor will continue at its current speed, and control continues at point H of FIG. 8.

Figure 7:
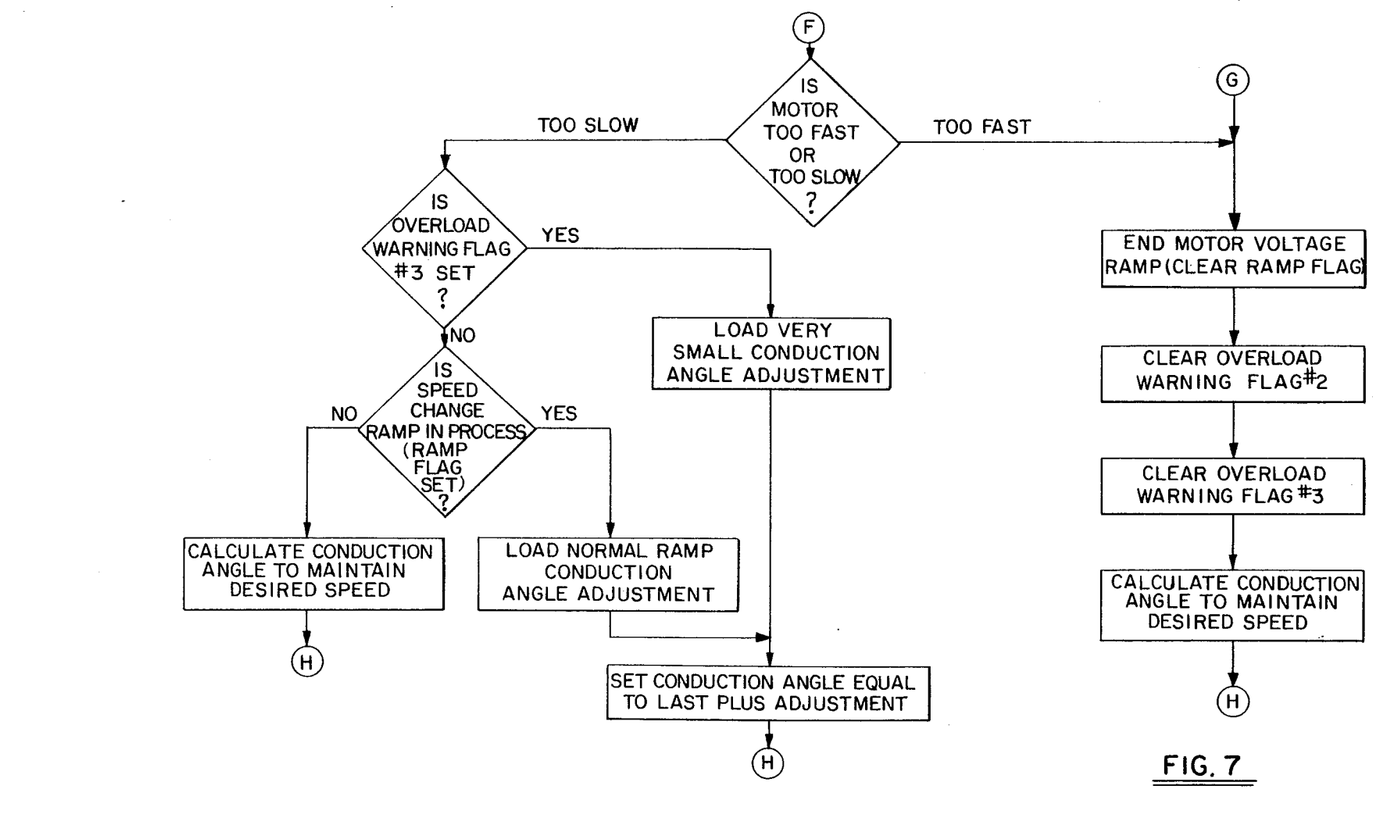
Figure 8:
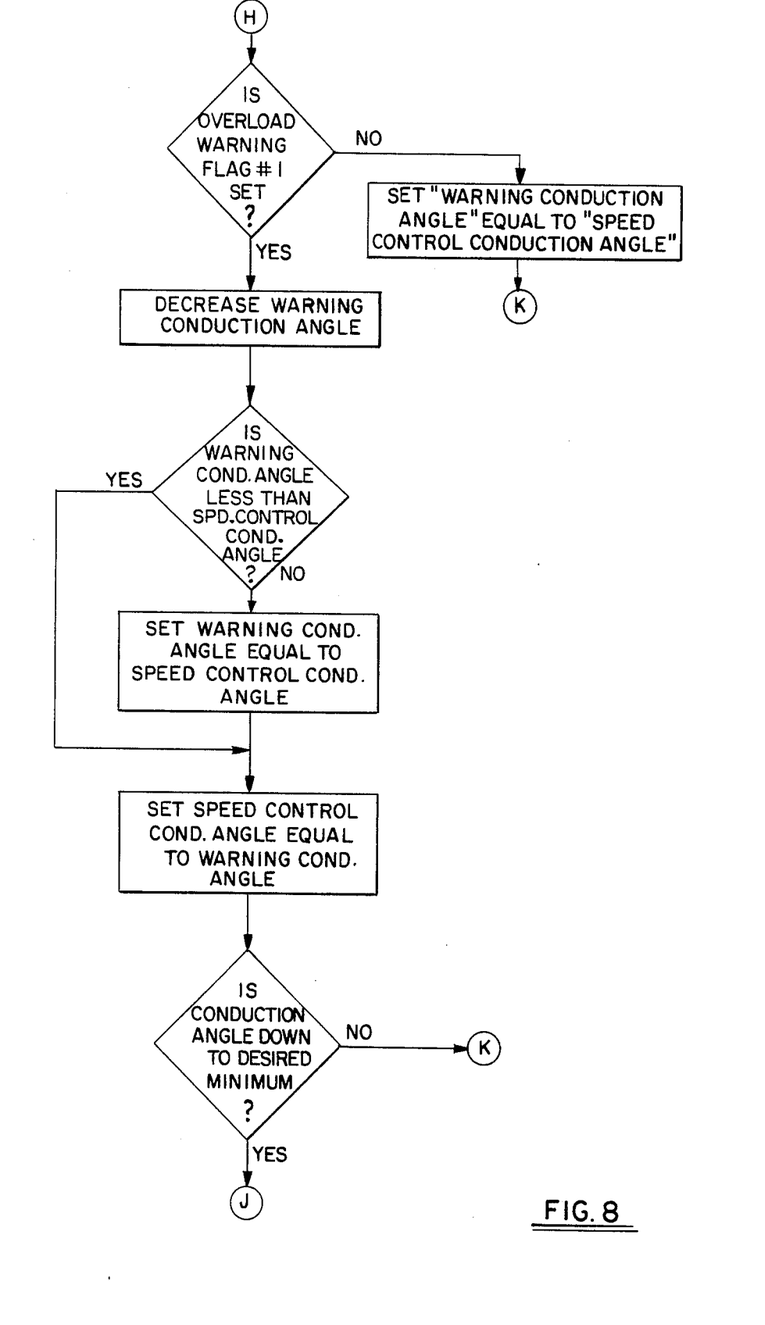

Before further analysis of the overload testing algorithm beginning at point H of FIG. 8, reference may be had to FIG. 7 for a better understanding of the speed-up and slow-down routine commencing at point F. If the motor speed is too fast, the routine beginning at point G is implemented, whereby the motor voltage ramp is terminated, by clearing a ramp flag. Next, the overload warning flags No. 2 and No. 3 are cleared. It will be recalled that the overload warning flag No. 2 is used to indicate that tool operation is in the warning mode characterzed by warbling or oscillating low-speed performance. The overload warning flag No. 3 gives a similar indication. Next, a calculation is performed to determine the conduction angle needed to maintain the desired speed. The "too fast" routine then branches to point H.

If the motor speed is too slow, the overload warning flag No. 3 is tested. If flag No. 3 is set, a very small conduction angle adjustment is made to permit the motor speed to ramp up slowly. A 0.864° conduction angle increment per line cycle is presently preferred. This is used to control the rate of power increase during the appropriate portion of the overload warning oscillation. If flag No. 3 is not set, and hence the tool is not in a warning mode, the ramp flag is interrogated to determine whether a speed change ramp is in progress. If a ramp is not in progress, a calculation is performed to determine the conduction angle needed to maintain the desired speed, whereupon control branches to point H. If a speed change ramp is in progress, the normal ramp conduction angle adjustment is loaded, causing the motor to speed up at a comparatively smooth rate by incrementing the previous conduction angle by the angle adjustment amount. Having adjusted the conduction angle, control then branches to point H which will now be discussed.

Referring to FIG. 8, the overload detection and warning algorithm is set forth. The algorithm begins by testing to determine whether the overload warning flag No. 1 is set. If the flag No. 1 is not set, a warning conduction angle value is set equal to the conduction angle used to determine the motor speed, whereupon control jumps to point K of FIG. 9. As will be further discussed, the routine beginning at point K handles the firing of the triac or thyristor during the even powerline half cycle. If the flag No. 1 is set, indicating that an overload has occurred, the warning conduction angle value is decreased by a predetermined amount, and then tested to determine whether it is less than the speed control conduction angle. Through this test and the next two indicated steps, the algorithm chooses the lesser of the speed control conduction angle and warning conduction angle, and then sets the speed control conduction angle to that lesser value. Thus when an overload condition has been detected, the warning conduction angle governs the motor speed, unless the tool operator has selected a lower speed or has rapidly removed the load from the tool. Finally, the conduction angle is tested to determine whether it has been reduced to a desired minimum, 78° being presently preferred. If the desired minimum has not yet been reached, control branches to point K discussed below. Otherwise, control branches to point J.

Figure 9:
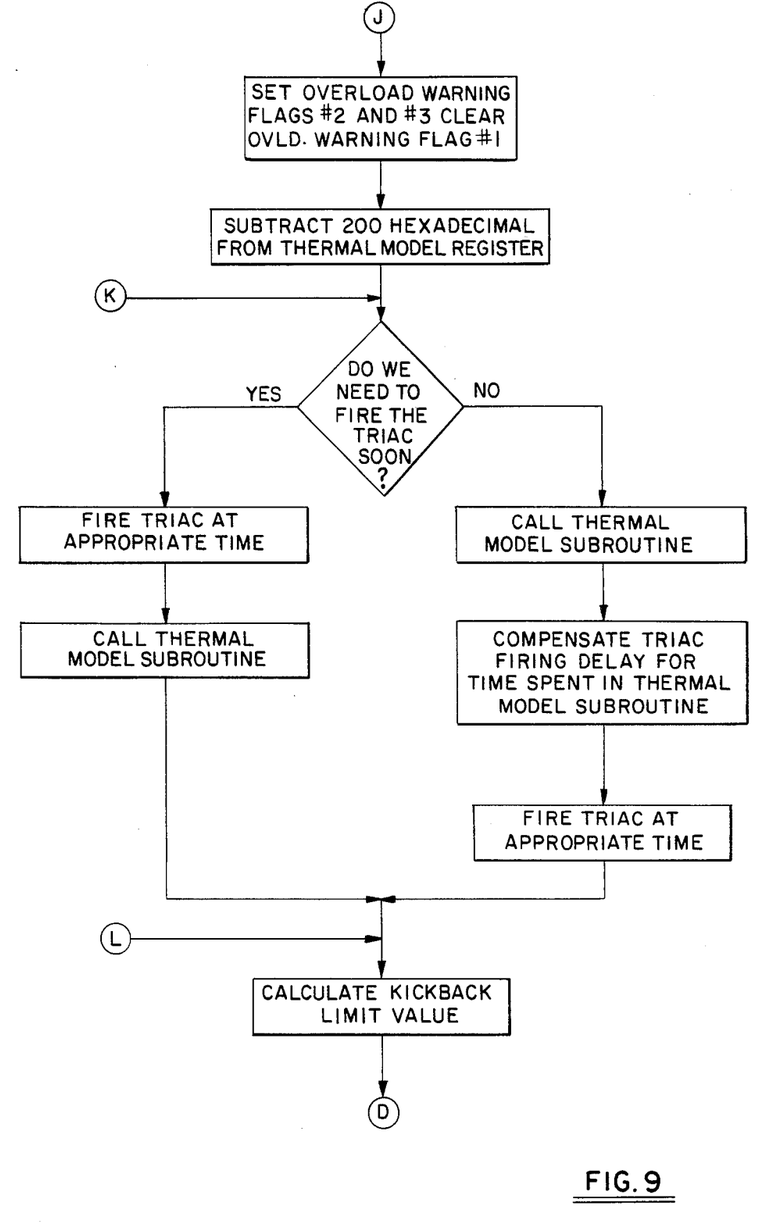

With reference to FIG. 9, at point J the routine sets the overload warning flags No. 2 and No. 3 and clears the overload warning flag No. 1, thus indicating that the bottom of the warning speed ramp has been reached. The thermal model register is then decremented by 200 hexadecimal units, thereby offsetting the thermal model from the overload point a small but sufficient distance to permit the motor speed to ramp up. The offset is small enough, however, that the overload level is again reached quickly. It will be seen that this offset provides a means for warbling low speed operation as the motor overload detection state is continually set and reset.

Following the thermal model register offset, the routine continues at point K with the even powerline half cycle triac firing routine. This routine begins by determining whether the triac must be fired early, or whether it must be fired late. If the thermal model lookup table matrix may be consulted before firing the triac, the triac firing delay must be altered to compensate for the time spent in the thermal model subroutine. On the other hand, if the triac must be fired without first calling the thermal model subroutine, no triac firing delay compensation is needed. After the thermal model subroutine has been executed and after the triac has been fired, control continues at point L by calculating the next kickback limit value and then branching to point D of FIG. 5, discussed earlier.

Figure 10:
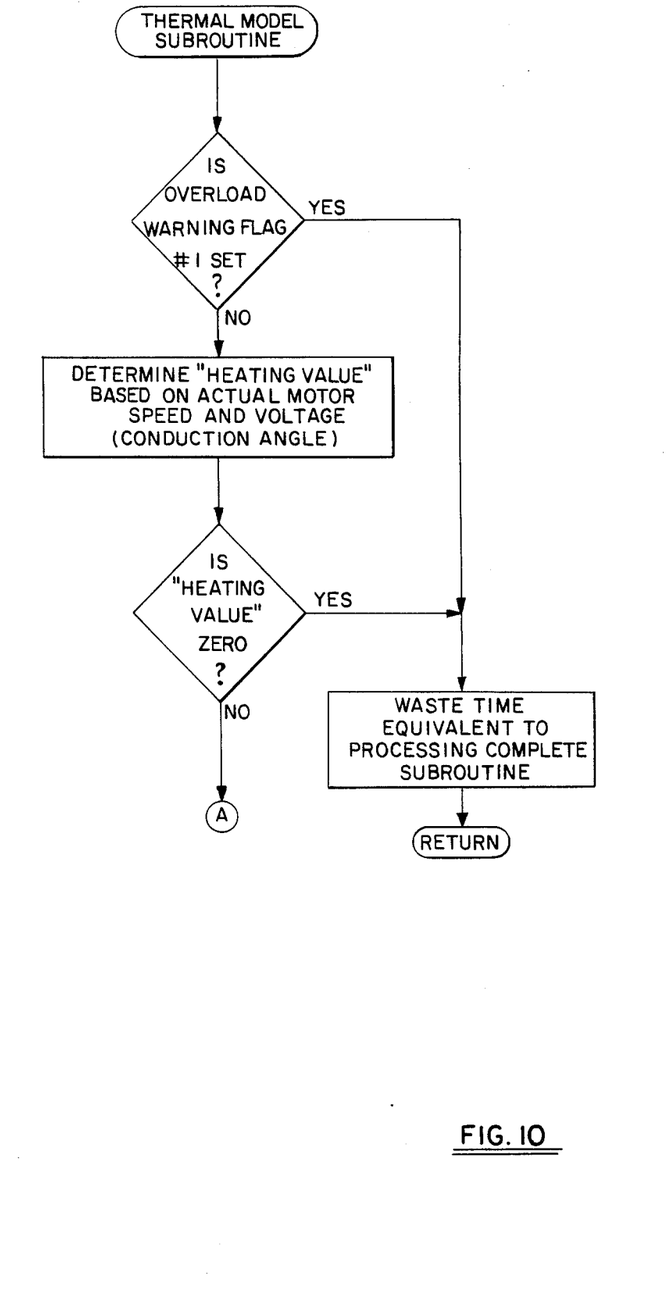
Figure 11:
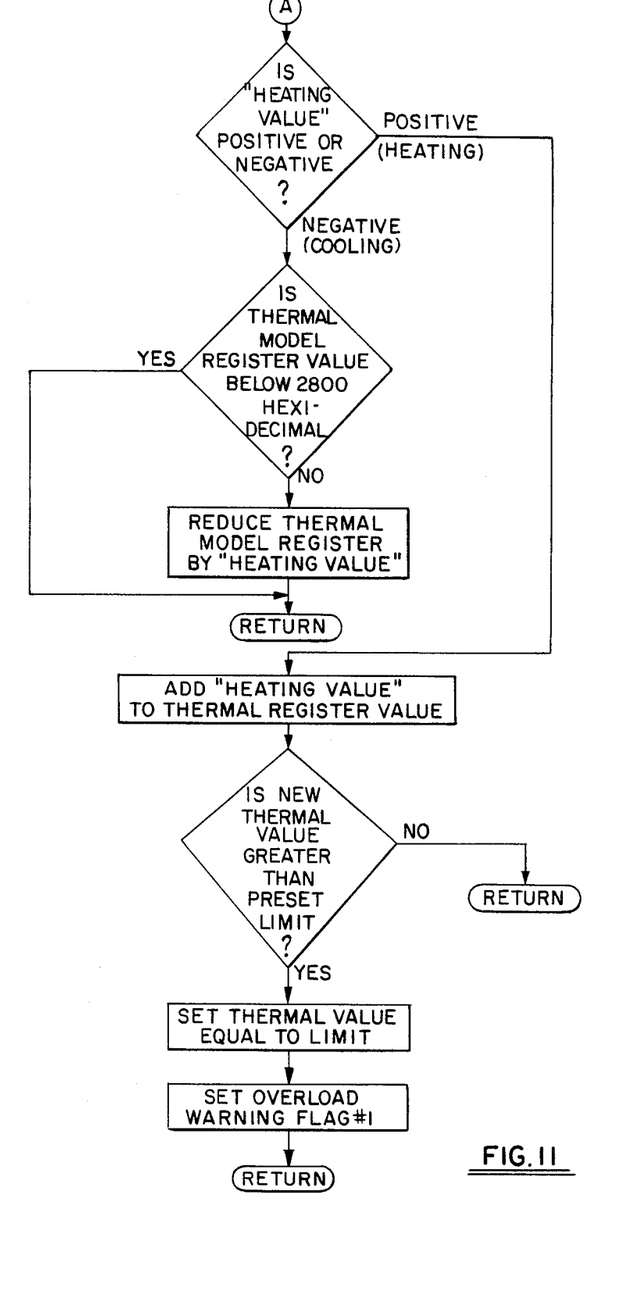

FIGS. 10 and 11 illustrate the thermal model subroutine in greater detail. This subroutine begins by testing to determine whether overload flag No. 1 is set. If the flag is set, a software timing loop is executed to waste time equivalent to the time needed to execute the thermal model subroutine. If the overload warning flag No. 1 is not set, a heating value is determined based on the actual motor speed and the voltage (conduction angle). This determination can be implemented using a look-up table constructed in accordance with the data given in FIG. 2. The heating value so determined is tested to determine whether it is zero or non-zero. If the heating value is zero, the routine proceeds to waste time equivalent to the time required to complete the thermal model subroutine. If the heating value is non-zero, its polarity must then be determined.

If the heating value is positive (heating), the heating value is added to the thermal model register value and the accumulated total is tested to see whether the pre-set overload limit has been reached. This pre-set overload limit may be supplied during power-up via the strap option settings. If the limit has not been reached, the subroutine returns to the calling program. If the thermal model value exceeds the pre-set overload limit, the thermal model value is set equal to the limit, the overload warning flag No. 1 is set, and control returns to the calling program.

If the heating value is negative (cooling), the routine determines whether the thermal model is below 2800 hex. If below 2800 hex, the cooling effect is known to be minimal and thus the routine immediately returns to the calling program without change to the thermal model register. If not below 2800 hex, the thermal model register is appropriately adjusted, based on the matrix heating (cooling) value, and control then returns to the calling program.

Figure 3:
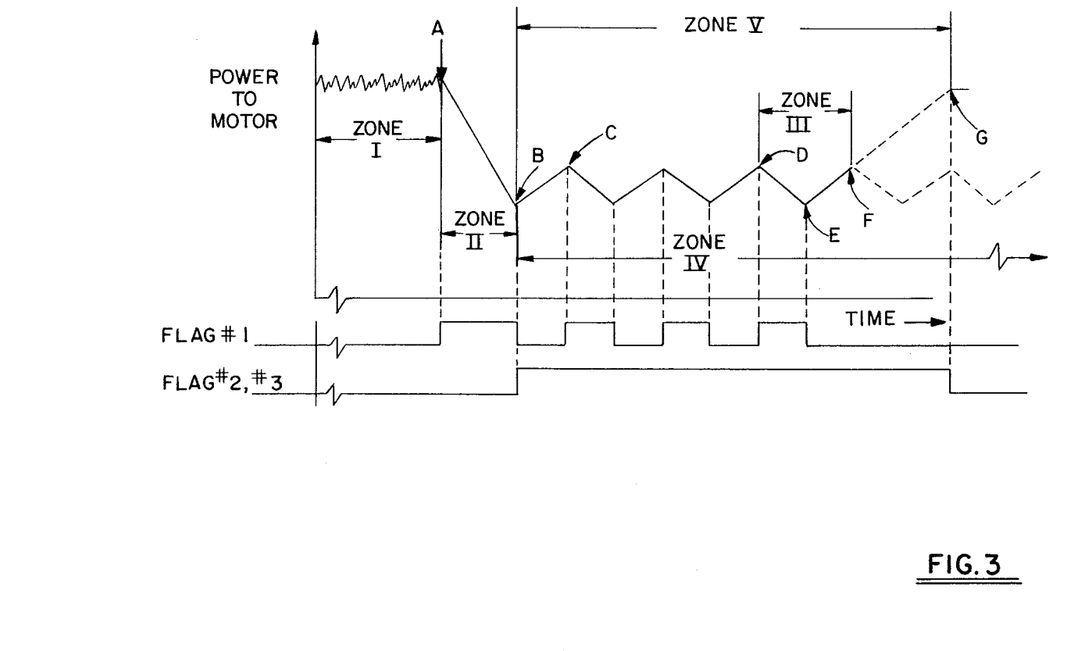
FIG. 3 is a graph illustrating the overload detection and warning system of the invention in operation.

FIG. 3 illustrates the above described algorithm in operation. As will be seen by consulating FIG. 3, the overload warning consists of a gradual reduction in the power delivered in a motor followed by a cyclic increase and decrease in the power delivered. Zone I in the figure represents a tool operating under heavy load. Under heavy load, motor speed will drop. In an attempt to maintain the desired speed, the electronic speed control circuit will supply maximum power to the motor. The combination of reduced speed and high power will result in a large value being accumulated in the thermal model register until the overload limit is reached. Point A in FIG. 3 depicts the point at which overload is reached and at which the warning is initiated.

Once overload is reached, power to the motor is gradually reduced following the line from point A to point B. This transition takes nominally 4.8 seconds in the presently preferred embodiment. Point B represents a conduction angle of approximately 78°. As indicated in the figure, at point A the overload detection flag No. 1 is set. When the speed control routine recognizes flag No. 1 as set, the routine gradually decreases the conduction angle of the triac, thereby reducing power to the motor. An expansion to this is if the load is suddenly removed thereby requiring a greater decrease in conduction angle in order to limit speed. When the conduction angle is down to 78° (point B), flags No. 2 and No. 3 are set and flag No. 1 is cleared. It is at this point that the thermal mode register is decreasd by 200 hexadecimal units. This combination of flat setting allows the conducton angle to increase at a rate of 0.864° per powerline cycle. With Flag. No. 1 cleared, the routine processes the thermal model algorithm as if an overload is not occurring (but is within 200 hexadecimal units of occurring). If the load is maintained, the thermal model register will again reach its overload limit in a few seconds, nominally 4 seconds, at point C. When point C is reached, flag No. 1 is again set. Zone IV of the figure represents the cyclic increase and decrease in applied power if the load is maintained. This cyclic increase and decrease in applied power causes the motor to warble or oscillate at a significantly reduced speed which can be readily recognized by the tool operator as a signal that an overload has occurred.

There are two primary reset modes for aborting the warning mode: removal of the load; and switching the trigger switch off. If the tool is removed from the load anytime within zone IV, power delivered to the motor will increase until the desired speed is reached (at which time the overload warning will be terminated). Specifically, if the load is removed when operation is between point E and point F (that is with flag No. 1 cleared and flags No. 2 and No. 3 set), the triac conduction angle will continue to increase at 0.864° per line cycle until the speed control algorithm senses that the desired speed has been reached (point G). Since the load has been removed, the thermal model register value will no longer increase, but will begin to decrease as the speed increases. When the desired speed is reached, flags No. 2 and No. 3 are cleared. If the load is not reapplied, the thermal model algorithm will recognize that the motor is continuing to cool. If the load is reapplied, the algorithm will produce another overload warning in a relatively short time. If the load is removed at a time within zone V when speed is decreasing, as between points D and E (flags No. 1, No. 2 and No. 3 set), the delivered power will continue to decrease until point E is reached. Once this point is reached and flag No. 1 is cleared, the power will increase from point E to point G.

If the tool trigger switch is turned off anytime between points B and G (i.e. anytime flag No. 2 is set), all three flags will be cleared and a 2,000 hexadecimal value will be subtracted from the thermal model register. When the trigger switch is turned back on, the routine will operate normally, not in the warning mode. With a load reapplied, there will be at least a moderate amount of time before the next overload warning. This amount of time depends on the specific speed and load in accordance with the thermal model algorithm. Thus the operator has two reset options. The operator can remove the load, which will terminate the warning but provide a second (third, etc.) warning in a relatively short time if he continues to abuse the tool; or the operator can turn the trigger switch off and then on again, which will terminate the warning and provide a longer time before a subsequent warning.

If the trigger switch is turned off and then on again prior to point A or after point G (all flags cleared), the release of the trigger switch will have no effect on the flags or on the thermal model register. When operation is in zone II (flag No. 1 set and flags No. 2 and No. 3 clear), release of the trigger switch will result in flag No. 1 being cleared and 100 hexadecimal units being subtracted from the thermal model register. In zone II the gradual reduction in speed might not be interpreted by the operator as an overload warning and therefore the warning is aborted and the overload register is adjusted to a value slightly below the overload limit.

While the above description constitutes the preferred embodiment of the present invention, it will be appreciated that the invention is susceptible to modification, variation and change without departing from the proper scope or fair meaning of the accompanying claims.

What is claimed is:

1. A method for providing a warning that a given operating condition in a power tool has been detected, comprising the steps of:
   (a) gradually reducing the power delivered to the tool upon detection of said given operating condition until a predetermined non-zero reduced level is reached; and
   (b) thereafter cyclically increasing and decreasing the power delivered to said tool in predetermined amounts to cause the tool to discernably exhibit a cyclic behavior which constitutes said warning.

2. The method of claim 1 wherein the given operating condition is an overload condition.

3. The method of claim 1 wherein said step of detecting the given operating condition is performed by sensing the operating speed of the tool.

4. The method of claim 1 wherein said step of detecting the given operating condition is performed by monitoring the power delivered to the tool.

5. The method of claim 1 wherein said step of detecting the given operating condition is performed by:
   storing a thermal model value indicative of the operating condition of the tool;
   sensing the operating speed of the tool;
   monitoring the power delivered to the tool;
   periodically altering the thermal model value in accordance with the sensed operating speed and power delivered; and
   periodically testing the thermal model value to determine its relationship to a predetermined limit value corresponding to the given operating condition.

6. The method of claim 1 further comprising:
   storing a thermal model value indicative of the operating condition of the tool;
   periodically altering the thermal model value in accordance with actual operating conditions of the tool and testing the thermal model value to determine if it has reached a predetermined limit value corresponding to the given operating condition.

7. The method of claim 6 further comprising modifying the thermal model value when said predetermined reduced power level is reached.

8. The method of claim 1 further comprising responding to a reduction in said load upon the tool by terminating the cyclical increase and decrease in power delivered.

9. The method of claim 1 further comprising terminating the cyclical increase and decrease in power delivered in response to a reset signal initiated by the tool operator.

10. The method of claim 9 wherein the tool is provided with a manually operable trigger and said reset signal is initiated by releasing the trigger.

11. The method of claim 9 wherein the given operating condition is an overload condition and the reset signal is initiated by the removal of the load from the tool.

* * * * *

UNITED STATES PATENT AND TRADEMARK OFFICE
CERTIFICATE OF CORRECTION

PATENT NO. : 4,550,277

DATED : October 29, 1985

INVENTOR(S) : Joseph E. Carney

It is certified that error appears in the above-identified patent and that said Letters Patent is hereby corrected as shown below:

Column 2, lines 65-66, "operartor" should be --operator--.

Column 5, line 20, "trasducer" should be --transducer--.

Column 5, line 40, "coverters" should be --converters--.

Column 6, line 28, "increased" should be --decreased--.

Column 6, line 44, after "actual, insert --armature--.

Column 7, line 46, "hexadecimcal" should be -- hexadecimal --.

Column 8, line 16, after "odd", insert --half--.

Column 8, line 30, "mecessary" should be --necessary--.

Column 8, line 32, "tht" should be --that--.

Column 8, line 45, "characterzed" should be --characterized--.

UNITED STATES PATENT AND TRADEMARK OFFICE
CERTIFICATE OF CORRECTION

PATENT NO. : 4,550,277
DATED : October 29, 1985
INVENTOR(S) : Josep E. Carney

It is certified that error appears in the above-identified patent and that said Letters Patent is hereby corrected as shown below:

Column 10, line 26, "consulating" should be --consulting--.

Column 10, line 48, "expansion" should be --exception--.

Column 10, line 53, "mode" should be --model--.

Column 10, line 54, "flat" should be --flag--.

Column 10, line 56, "Flag." should be --flag--.

Column 12, line 50, claim 8, after "in", delete --said--.

Signed and Sealed this

Fourth Day of March 1986

[SEAL]

Attest:

DONALD J. QUIGG

Attesting Officer

Commissioner of Patents and Trademarks